US011333349B2

(12) United States Patent
Lee et al.

(10) Patent No.: US 11,333,349 B2
(45) Date of Patent: May 17, 2022

(54) FLUID SAND FALLING TYPE CIRCULATING FLUIDIZED BED BOILER WITH A PLURALITY OF RISERS AND METHOD OF OPERATING THE SAME

(71) Applicants: KOREA INSTITUTE OF INDUSTRIAL TECHNOLOGY, Cheonan-si (KR); KOREA INSTITUTE OF ENERGY RESEARCH, Daejeon (KR); KOREA INSTITUTE OF MACHINERY & MATERIALS, Daejeon (KR)

(72) Inventors: Uen Do Lee, Daejeon (KR); Byeong Ryeol Bang, Seoul (KR); Young Doo Kim, Chungcheongnam-do (KR); Soo Hwa Jeong, Cheonan-si (KR); Chang Won Yang, Incheon (KR); Jae Goo Lee, Daejeon (KR); Tae Young Mun, Sejong-si (KR); Myung Won Seo, Daejeon (KR); Ji Hong Moon, Sejong-si (KR); Hyun Seol Park, Daejeon (KR); Joon Mok Shim, Sejong-si (KR); Young Cheol Park, Daejeon (KR); Do Won Shun, Daejeon (KR); Jong Ho Moon, Daejeon (KR); Dal Hee Bae, Sejong-si (KR); Sung Ho Jo, Daejeon (KR); Yun Tae Hwang, Daejeon (KR); Sang In Keel, Daejeon (KR); Jin Han Yun, Daejeon (KR); ChungKyu Lee, Daejeon (KR); Pil Woo Heo, Daejeon (KR)

(73) Assignees: Korea Institute of Industrial Technology, Cheonan-si (KR); Korea Institute of Energy Research, Daejeon (KR); Korea Institute of Machinery & Materials, Daejeon (KR)

(*) Notice: Subject to any disclaimer, the term of this patent is extended or adjusted under 35 U.S.C. 154(b) by 50 days.

(21) Appl. No.: 16/401,465

(22) Filed: May 2, 2019

(65) Prior Publication Data
US 2020/0025366 A1 Jan. 23, 2020

(30) Foreign Application Priority Data

Jul. 19, 2018 (KR) .................. 10-2018-0083756

(51) Int. Cl.
*F22B 31/00* (2006.01)
*F23C 10/12* (2006.01)
(Continued)

(52) U.S. Cl.
CPC ........ *F22B 31/003* (2013.01); *F22B 31/0069* (2013.01); *F22B 31/0084* (2013.01);
(Continued)

(58) Field of Classification Search
CPC ...... F23C 10/00; F23C 10/20; F23C 2700/04; F23C 10/10; F23C 10/12; F23C 10/22;
(Continued)

(56) References Cited

U.S. PATENT DOCUMENTS

| 1,034,337 | A | * | 7/1912 | Barrow | ................. F22B 13/145 |
| | | | | | 122/68 |
| 4,508,041 | A | * | 4/1985 | Voetter | ..................... F23C 6/04 |
| | | | | | 110/347 |

(Continued)

FOREIGN PATENT DOCUMENTS

| CN | 103363516 B | * 10/2015 | ............ F22B 31/003 |
| CN | 107044633 A | * 8/2017 | |

(Continued)

OTHER PUBLICATIONS https://en.wikipedia.org/w/index.php?title=Combustion&oldid=758638090 (Year: 2017).*

(Continued)

*Primary Examiner* — David J Laux
(74) *Attorney, Agent, or Firm* — Rabin & Berdo, P.C.

(57) ABSTRACT

Disclosed herein are a fluid sand falling type circulating fluidized bed boiler with a plurality of risers for preventing erosion and corrosion of water tubes and increasing combustion efficiency, and a method of operating the same. The fluid sand falling type circulating fluidized bed boiler with a plurality of risers includes a boiler section into which fuel (Continued)

and oxidizer are injected, a riser section connected to the boiler section so that the fuel and fluid sand supplied from the boiler section are introduced from the bottom of the riser section and flow up, and a relay section provided on the boiler section to supply the fluid sand having passed through the riser section to the boiler section, wherein the fuel is injected from the top of the boiler section and burned while flowing down therein.

13 Claims, 4 Drawing Sheets

(51) Int. Cl.
  *F23C 10/20* (2006.01)
  *F23C 10/22* (2006.01)
(52) U.S. Cl.
  CPC .............. *F23C 10/12* (2013.01); *F23C 10/20* (2013.01); *F23C 10/22* (2013.01); *F23C 2206/10* (2013.01); *F23C 2700/02* (2013.01)
(58) Field of Classification Search
  CPC . F23C 2206/10; F23C 2700/02; B01J 8/0055; F22B 31/0084; F22B 31/003; F22B 31/0069; F23G 5/30
  See application file for complete search history.

(56) References Cited

U.S. PATENT DOCUMENTS

| | | | | |
|---|---|---|---|---|
| 4,947,804 A | * | 8/1990 | Abdulally | B01J 8/26 110/216 |
| 7,141,219 B1 | * | 11/2006 | Klaren | B01J 8/003 422/147 |
| 8,689,709 B2 | * | 4/2014 | Vimalchand | F22B 1/22 110/245 |
| 2009/0056603 A1 | * | 3/2009 | Havlena | F23C 10/10 110/245 |
| 2013/0055936 A1 | * | 3/2013 | Vimalchand | B01J 8/388 110/245 |
| 2017/0363284 A1 | * | 12/2017 | Axelbaum | F23L 7/007 |

FOREIGN PATENT DOCUMENTS

| | | | | |
|---|---|---|---|---|
| JP | 253250 | B2 | | 9/1996 |
| JP | 2657854 | B2 | | 9/1997 |
| JP | 10-089640 | A | | 4/1998 |
| JP | 2004132621 | A | * | 4/2004 |
| JP | 2007-512495 | A | | 5/2007 |
| JP | 2009250571 | A | * | 10/2009 |
| KR | 10-1526959 | B1 | | 6/2015 |
| KR | 10-1779444 | B1 | | 9/2017 |
| WO | WO-9322600 | A1 | * | 11/1993 ............. F23C 10/16 |

OTHER PUBLICATIONS

Keyes MA, Derreberry BC, Kaya A. Applications of Systems Engineering to Control Fluidized-Bed Boilers. Fluidized bed combustion and applied technology : the first international symposium. Dec. 1, 1984: III. 147-III. 171. (Year: 1984).*
CN-103363516-B translation.*
Korean Office Action dated Jun. 7, 2019.

* cited by examiner

FLUID SAND FALLING TYPE CIRCULATING FLUIDIZED BED BOILER WITH A PLURALITY OF RISERS AND METHOD OF OPERATING THE SAME

BACKGROUND OF THE INVENTION

Field of the Invention

The present invention relates to a fluid sand falling type circulating fluidized bed boiler with a plurality of risers and a method of operating the same, and more particularly, to a fluid sand falling type circulating fluidized bed boiler with a plurality of risers for preventing erosion and corrosion of water tubes and increasing combustion efficiency, and a method of operating the same.

Description of the Related Art

In recent years, there has been an increased demand for circulating fluidized bed boilers capable of utilizing low-grade fuel due to a policy on reduction of carbon dioxide and expansion of new renewable energy. However, since the regulation of air pollution of thermal power generation is greatly strengthened, a boiler technology is required that can drastically reduce sulfur oxides and nitrogen oxides.

In addition, there has recently been a demand for power generation systems capable of flexibly responding to electric power demand with an increase in use of natural energy such as high volatile sunlight and wind power.

In this situation, the demand for circulating fluidized bed boilers is increased in the market since the desulfurization in its furnace is possible, but it is difficult to flexibly control the cost increase and output of the boilers because of abrasion due to fluid sand and use of desulfurizing agents.

Specifically, a conventional circulating fluidized bed boiler had to maintain the flow rate of fluid sand at 4 to 5 m/s in its riser in order to continuously circulate the fluid sand. However, the conventional circulating fluidized bed boiler is problematic in that a water tube disposed in the riser is corroded and eroded by the fluid sand rapidly transferred therein.

In addition, the time for which fuel, additives, etc. stay in the conventional circulating fluidized bed boiler may be shortened since the boiler is provided to maintain the flow rate of fluid sand at 4 to 5 m/s in order to continuously circulate the fluid sand, resulting in deterioration of combustion efficiency, desulfurization efficiency, and denitrification efficiency.

Circulating fluidized bed boilers require a minimum amount of gas to circulate fluid sand for operation. However, since the conventional circulating fluidized bed boiler requires a large amount of gas, it is difficult to flexibly respond to the load variation of the boiler.

Furthermore, since the water tube is mainly installed on the inner wall surface of the riser in the conventional circulating fluidized bed boiler, the entire equipment is very large. Hence, it is difficult to efficiently utilize a space.

Accordingly, there is a need for a circulating fluidized bed boiler capable of increasing combustion efficiency and flexibly controlling output while preventing erosion and corrosion of water tubes.

CITATION LIST

Patent Literature

Patent Literature 1: Japanese Patent No. 2657854

SUMMARY OF THE INVENTION

The present invention has been made in view of the above-mentioned problems, and an object thereof is to provide a fluid sand falling type circulating fluidized bed boiler with a plurality of risers for preventing erosion and corrosion of water tubes and increasing combustion efficiency, and a method of operating the same.

The present invention is not limited to the above-mentioned object, and other objects of the present invention can be clearly understood by those skilled in the art to which the present invention pertains from the following description.

In accordance with an aspect of the present invention, there is provided a fluid sand falling type circulating fluidized bed boiler with a plurality of risers, which includes a boiler section into which fuel and oxidizer are injected, a riser section connected to the boiler section so that the fuel and fluid sand supplied from the boiler section are introduced from the bottom of the riser section and flow up, and a relay section provided on the boiler section to supply the fluid sand having passed through the riser section to the boiler section, wherein the fuel is injected from the top of the boiler section and burned while flowing down therein.

In the aspect of the present invention, the fluid sand falling type circulating fluidized bed boiler may further include a plurality of water tube sections provided in the inner portion of the boiler section and extending in a height direction of the boiler section.

In the aspect of the present invention, the fluid sand falling type circulating fluidized bed boiler may further include a plurality of oxidizer injection sections spaced apart from each other in a height direction of the boiler section and further provided in the lower portion of the riser section, and each output of the oxidizer injection sections may be individually controlled to control descending rates of the fluid sand and the fuel and combustion of the fuel.

In the aspect of the present invention, the fluid sand falling type circulating fluidized bed boiler may further include a first fuel injection section provided at one side of the upper portion of the boiler section to inject the fuel into the boiler section.

In the aspect of the present invention, the fluid sand falling type circulating fluidized bed boiler may further include a second fuel injection section provided at one side of the lower portion of the riser section to inject fuel, having a combustion rate higher than the fuel supplied into the boiler section, to the riser section.

In the aspect of the present invention, the riser section may consist of a plurality of riser sections arranged along the circumference of the boiler section or in the inner portion of the boiler section.

In the aspect of the present invention, the fluid sand falling type circulating fluidized bed boiler may further include a heat exchange section provided on the wall surface and in the inner portion of the boiler section to perform heat exchange using combustion gas produced by burning fuel.

In the aspect of the present invention, the fluid sand falling type circulating fluidized bed boiler may further include a first cyclone section provided between the riser section and the relay section, and the first cyclone section may be provided to transfer the combustion gas heated while passing through the riser section to a repeater of the heat exchange section.

In the aspect of the present invention, the fluid sand falling type circulating fluidized bed boiler may further include a second cyclone section connected to the upper portion of the boiler section, and the second cyclone section may serve to transfer the combustion gas produced in the boiler section to a convection heat exchanger of the heat exchange section.

In accordance with another aspect of the present invention, there is provided a method of operating a fluid sand falling type circulating fluidized bed boiler with a plurality of risers, which includes a) a step of determining an operation mode or operation of each of a plurality of riser sections, b) a step of injecting fuel and oxidizer into a boiler section to burn the fuel, c) a step of transferring the fuel and fluid sand supplied from the boiler section to each of the riser sections to a first cyclone section, d) a step of transferring heated combustion gas transferred to the first cyclone section to a repeater of a heat exchange section and transferring the fluid sand to a relay section, and e) a step of resupplying the fluid sand transferred to the relay section to the boiler section, wherein the fuel is burned while flowing down in the boiler section, and the fuel is burned while flowing up in the riser section.

In the aspect of the present invention, in the b) step, the combustion gas produced by burning the fuel in the boiler section may be transferred to a convection heat exchanger of the heat exchange section through a second cyclone section.

In the aspect of the present invention, in the b) step, each output of a plurality of oxidizer injection sections for injecting oxidizer into the boiler section may be individually controlled to control descending rates of the fluid sand and the fuel and combustion of the fuel.

In the aspect of the present invention, in the c) step, fuel, having a combustion rate higher than the fuel supplied into the boiler section, may be further supplied to the riser section.

In the aspect of the present invention, in the c) step, the combustion gas produced in the riser section may have a higher temperature than the combustion gas produced in the boiler section and may be supplied to the repeater to further increase the temperature and pressure of steam.

In the aspect of the present invention, in the a) step, the operation mode may be an pure oxygen combustion mode and an air combustion mode.

In accordance with still another aspect of the present invention, there is provided a power generation plant using a fluid sand falling type circulating fluidized bed boiler with a plurality of risers In accordance with a further aspect of the present invention, there is provided a power generation system for pure oxygen thermal power generation using a method of operating a fluid sand falling type circulating fluidized bed boiler with a plurality of risers

DETAILED DESCRIPTION OF THE PREFERRED EMBODIMENTS

Figure 1:
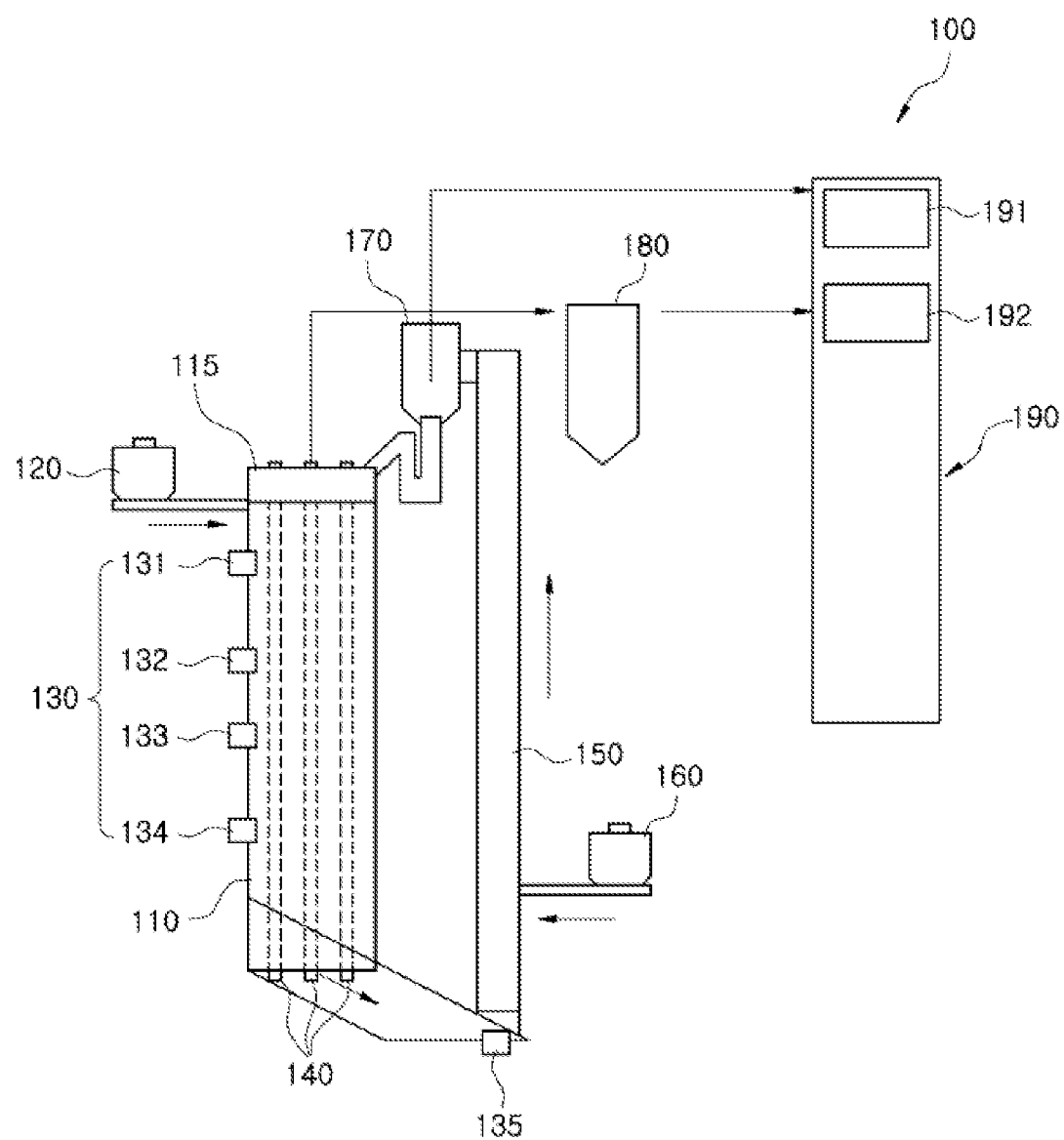
FIGS. 1 and 2 are views illustrating an example of a fluid sand falling type circulating fluidized bed boiler with a plurality of risers according to an embodiment of the present invention.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless the context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

Figure 2:
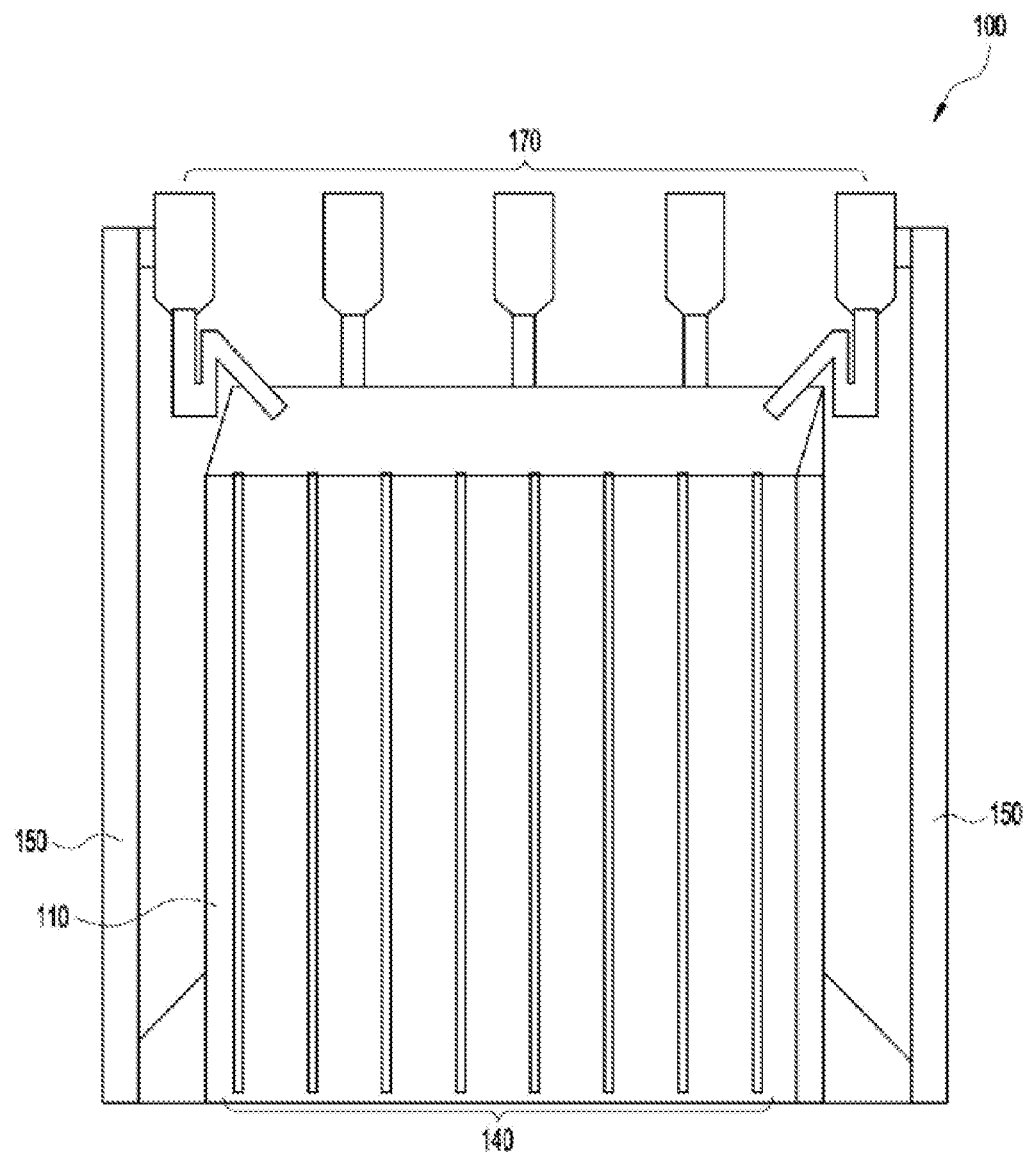

FIGS. 1 and 2 are views illustrating an example of a fluid sand falling type circulating fluidized bed boiler with a plurality of risers according to an embodiment of the present invention.

As illustrated in FIGS. 1 and 2, the fluid sand falling type circulating fluidized bed boiler with a plurality of risers, which is designated by reference number 100, includes a boiler section 110, a relay section 115, a first fuel injection section 120, oxidizer injection sections 130, a water tube section 140, a riser section 150, a second fuel injection section 160, a first cyclone section 170, a second cyclone section 180, and a heat exchange section 190.

The boiler section 110 may be provided such that fuel and oxidizer are injected thereinto.

Specifically, the boiler section 110 may be provided in the form of a furnace for combustion of fuel. In the boiler section 110, fluid sand, fuel, and additives may flow downward.

The relay section 115 may be disposed on the boiler section 110 and may be provided such that the fluid sand, which passes through the riser section 150 and is separated from combustion gas in the first cyclone section 170, is supplied to the boiler section 110.

In more detail, the relay section 115 may be provided such that the fluid sand is evenly distributed and flows down in the boiler.

The first fuel injection section 120 may be provided at one side of the upper portion of the boiler section 110 to inject fuel into the boiler section 110.

That is, the fuel may be injected from the top of the boiler section 110 to flow down for combustion.

The oxidizer injection sections 130 may be spaced apart from each other in a height direction of the boiler section 110 in a multistage form, and may further be provided in the lower portion of the riser section 150.

The outputs of the oxidizer injection sections 130 may be individually controlled to control the descending rates of fluid sand and fuel and the combustion of fuel.

For example, the oxidizer injection sections 130 may include a first nozzle 131, a second nozzle 132, a third nozzle 133, and a fourth nozzle 134 which are sequentially arranged downward from the top of the boiler section 110.

When an amount of flow needs to be changed at a position corresponding to the second nozzle 132 in the boiler section 110, it is possible to control the injection amount of oxidizer into the second nozzle 132. That is, when an amount of flow needs to be increased at a position corresponding to the second nozzle 132, it is possible to increase an amount of flow and a flow rate at the corresponding position by increasing the injection amount of oxidizer into the second nozzle 132.

The water tube section 140 may consist of a plurality of water tube sections that are provided on the outer wall and in the internal space of the boiler section 110 and extend in the height direction of the boiler section 110.

This water tube section 140 may be free from erosion and corrosion. Specifically, the present invention is implemented such that the fluid sand flows down in the boiler section 110 and the water tube section 140, which is conventionally disposed in the riser section 150, is disposed in the boiler section 110. Accordingly, since the boiler section 110 of the present invention does not need to maintain a high flow rate of 4 to 5 m/s to circulate fluid sand, the fluid sand may not cause the erosion or corrosion of the water tube section 140.

Furthermore, the flow rate in the boiler section 110 of the present invention can be controlled according to the injection amount of oxidizer into the oxidizer injecting sections 130 in the multistage form so that the fluid sand and the fuel flow down at a low speed. Therefore, it is possible to prevent the erosion and corrosion of the water tube.

The present invention has an effect of implementing full combustion by adjusting the reaction time of fuel and oxidizer and utilizing a re-combustion technique in the process of speed control through the multistage supply of the oxidizer since the residence time of particles is adjustable through the control of the flow rate in the boiler section 110.

Although not illustrated in the drawings, additives such as desulfurizing agent and denitrifying agent may be further injected into the boiler section 110, and reactivity may be increased through the use of additives having a smaller particle size. As such, the additives injected into the boiler section 110 can maximize the effect while reacting for a long time in the boiler section 110 in which the flow rate is slower compared to that in the related art.

Since a large number of water tube sections 140 are arranged in the internal space as well as on the outer wall of the boiler section 110, the fluid sand falling type circulating fluidized bed boiler 100 of the present invention is reduced in volume and is economical.

The riser section 150 may be connected to the boiler section 110 and may be provided such that fuel and fluid sand are supplied through the bottom thereof from the boiler section 110 and flow up.

A fifth nozzle 135, which is one of the oxidizer injection sections 130, may be further provided in the lower portion of the riser section 150. This fifth nozzle 135 may be provided to decrease the injection amount of oxidizer when the amount of flow and the flow rate are increased in the riser section 150 whereas to increase the injection amount of oxidizer when the amount of flow and the flow rate are decreased in the riser section 150.

The second fuel injection section 160 may be provided at one side of the lower portion of the riser section 150 to inject fuel into the riser section 150. This second fuel injection section 160 may further inject fuel when it is necessary to increase the amount of fuel in the riser section 150.

Particularly, the second fuel injection section 160 may be provided to inject fuel having a combustion rate higher than the fuel supplied into the boiler section 110.

The riser section 150 may be provided in the form of a pipe having a smaller diameter than the boiler section 110.

This riser section 150 has a smaller diameter than the boiler section 110, and the first cyclone section 170 has a very small size compared to an existing boiler.

In addition, the riser section 150 may consist of a plurality of riser sections arranged in the inner portion or along the circumference of the boiler section 110, as illustrated in the drawings.

The riser sections 150 may be independently operated. That is, the plurality of riser sections 150 may be operated simultaneously as a whole or may be partially operated.

Thus, the present invention can easily control the total output of the boiler according to the number of operated riser sections 150.

Each of the riser sections 150 may be individually operated in a pure oxygen combustion mode or in an air combustion mode.

Since the riser sections 150 sequentially start to operate when the fluid sand falling type circulating fluidized bed boiler with a plurality of risers 100 starts to operate in the present invention, the operation preparation time for circulation of fluid sand can be significantly shortened compared to the related art.

In the conventional circulating fluidized bed boiler, there is a limit in reducing the output thereof because it is necessary to maintain a minimum supply amount of oxidizer required to circulate the entire fluid sand when the fuel injected is reduced to reduce the output and the supply amount of oxidizer is reduced. However, since the plurality of riser sections 150 are provided in the present invention, an amount required to circulate fluid sand is small. In addition, the present invention can resolve the constraints when the absolute amount of oxidizer and carbon dioxide to be supplied according to the concentration increase of oxidizer during pure oxygen combustion is reduced, so that the operation can be performed at various oxidizer concentrations.

In addition, the present invention can implement CCS technology in which the boiler operates in the air combustion mode and all or part of the riser sections 150 operate in the pure oxygen combustion mode to uniformly maintain the total power output and to separate pure carbon dioxide from the exhaust gas of some riser sections 150 for utilizing it.

The first cyclone section 170 may be connected to the upper sides of the boiler section 110 and the riser section 150 to supply the fluid sand having passed through the riser section 150 to the relay section 115.

The boiler section 110, riser section 150, first cyclone section 170, and relay section 115 thus provided may continue to circulate the fluid sand.

The heat exchange section 190 may be connected to the boiler section 110 and the riser section 150 to perform heat exchange using the combustion gas produced by the combustion of fuel. The heat exchange section 190 includes a repeater 191 and a convection heat exchanger 192.

The first cyclone section 170 may be provided to transfer the combustion gas heated while passing through the riser section 150 to the reheater 191 of the heat exchange section 190. In this case, the combustion gas transferred to the reheater 191 by the first cyclone section 170 may have a temperature of 900° C. or more. Here, the reheater 191 may also be a final superheater.

The second cyclone section 180 is connected to the upper portion of the boiler section 110 and provided to transfer the combustion gas produced in the boiler section 110 to the convection heat exchanger 192 of the heat exchange section 190. In this case, the combustion gas transferred to the convection heat exchanger 192 by the second cyclone section 180 may have a temperature of 800° C. to less than 900° C.

As such, the present invention is implemented such that the combustion gas produced in the boiler section 110 and the combustion gas having a relatively high temperature, compared to the combustion gas produced in the boiler section 110, are separated by passing through the riser section 150 and transferred to the convection heat exchanger 192 and the reheater 191. Therefore, the heat exchange section 190 can produce steam having a higher temperature and pressure than in the related art. That is, the thermal efficiency of the heat exchange section 190 of the present invention can be enhanced.

In addition, the present invention enables the use of materials such as fluid sand, desulfurizing agent, and additives having a small particle size compared to an existing boiler. Specifically, since the plurality of riser sections 150 are provided in the present invention, the size of the first cyclone section 170 connected to the riser sections 150 is greatly reduced, with the consequence that it is possible to significantly increase particle collection efficiency and use smaller particles. As the sizes of the fluid sand particles are reduced, the power of the fan (not shown) of the riser section 150 used for circulation is reduced, which enables an improvement in power generation efficiency.

Figure 3:
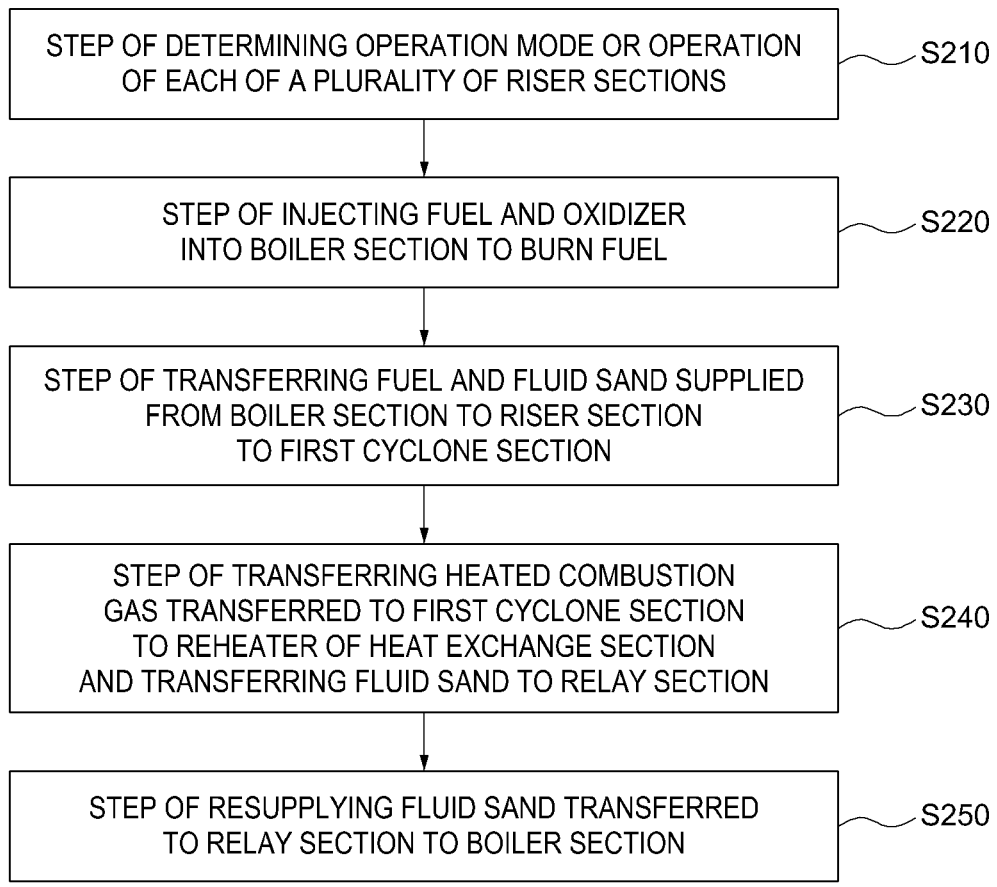
FIG. 3 is a flowchart illustrating a method of operating a fluid sand falling type circulating fluidized bed boiler with a plurality of risers according to an embodiment of the present invention.
Figure 4:
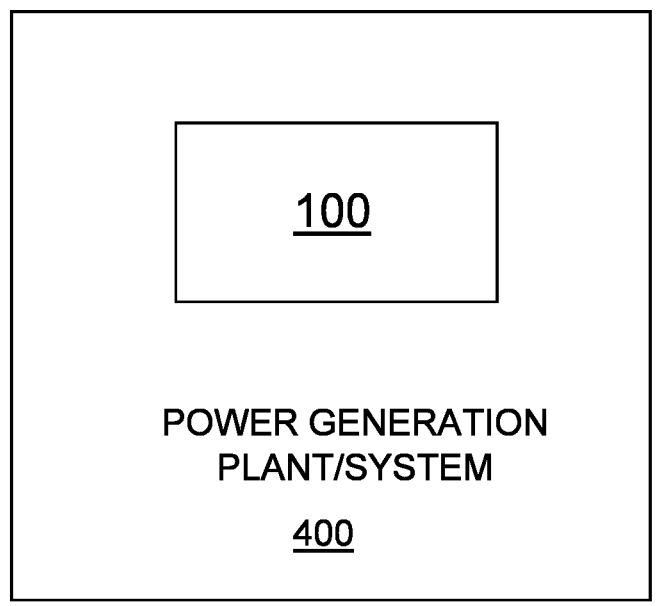
FIG. 4 shows a power generation plant/system having a fluid sand falling type circulating fluidized bed boiler.

FIG. 3 is a flowchart illustrating a method of operating a fluid sand falling type circulating fluidized bed boiler with a plurality of risers according to an embodiment of the present invention.

Further referring to FIG. 3, the method of operating the fluid sand falling type circulating fluidized bed boiler with a plurality of risers 100 first includes a step of determining the operation mode or operation of each of the plurality of riser sections (S210).

In the step of determining the operation mode or operation of each of the plurality of riser sections (S210), the operation mode may refer to a pure oxygen combustion mode and an air combustion mode. That is, in the step of determining the operation mode or operation of each of the plurality of riser sections (S210), it may be determined whether each of the riser sections 150 is operated in the pure oxygen combustion mode or in the air combustion mode, and the operation of each of the riser sections 150 may also be determined.

After the step of determining the operation mode or operation of each of the plurality of riser sections (S210), a step of injecting fuel and oxidizer into the boiler section 110 to burn the fuel (S220) may be performed.

In the step of injecting fuel and oxidizer into the boiler section 110 to burn the fuel (S220), fuel, fluid sand, and additives may be injected to the upper portion of the boiler section 110. The fuel may be burned while flowing down in the boiler section 110, and the additives may induce denitrification and desulfurization reactions in the fuel and the combustion gas produced by burning the fuel. In this case, a fluid may flow in the plurality of water tube sections 140 provided in the boiler section 110 so that heat exchange is performed.

In addition, the combustion gas produced by burning the fuel in the boiler section 110 may be transferred through the second cyclone section 180 to the convection heat exchanger 192 of the heat exchange section 190.

In the step of injecting fuel and oxidizer into the boiler section 110 to burn the fuel (S220), the outputs of plurality of oxidizer injection sections 130 for injecting oxidizer into the boiler section 110 may be individually controlled to control the descending rates of fluid sand and fuel and the combustion of fuel.

That is, the oxidizer injection sections 130 may control an amount of flow and a flow rate for each position in the boiler section 110 by controlling the injection amount of oxidizer.

After the step of injecting fuel and oxidizer into the boiler section 110 to burn the fuel (S220), a step of transferring the fuel and fluid sand supplied from the boiler section to each of the riser sections to the first cyclone section (S230) may be performed.

In the step of transferring the fuel and fluid sand supplied from the boiler section to each of the riser sections to the first cyclone section (S230), the fuel, the fluid sand, the additives, etc. having passed through the boiler section 110 may be introduced to the lower portion of the riser section 150, and the introduced fuel, fluid sand, additives may be transferred to the first cyclone section 170 connected to the upper portion of the riser section 150. In this case, the fuel may be burned while flowing.

As such, the fuel may be burned while flowing down in the boiler section 110, and the fuel may be burned while flowing up in the riser section 150.

The fuel flowing up in the riser section 150 is burned to produce combustion gas. The temperature of the combustion gas produced at this time is higher than that of the combustion gas produced in the boiler section 110.

In the step of transferring the fuel and fluid sand supplied from the boiler section to each of the riser sections to the first cyclone section (S230), the riser section 150 may be further supplied with fuel and additives. The combustion rate of the fuel supplied at this time may be higher than that of the fuel supplied to the boiler section 110.

After the step of transferring the fuel and fluid sand supplied from the boiler section to each of the riser sections to the first cyclone section (S230), a step of transferring the heated combustion gas transferred to the first cyclone section to the reheater of the heat exchange section and transferring the fluid sand to the relay section (S240) may be performed.

In the step of transferring the heated combustion gas transferred to the first cyclone section to the reheater of the heat exchange section and transferring the fluid sand to the relay section (S240), the combustion gas produced while passing through the riser section 150 may be transferred to the reheater 191 of the heat exchange section 190 by the first cyclone section 170, and the fluid sand may be transferred to the relay section 115 formed on the boiler section 110 for circulation.

That is, the combustion gas produced in the boiler section 110 and the combustion gas produced while passing through the riser section 150 may be transferred to the cyclone sections connected thereto and then separated from each other for transfer to the heat exchange section 190. That is, in the present invention, since the first cyclone section 170 and the second cyclone section 180 are separately provided, it is possible to prevent the transfer of fine particles (crushed fluid sand or ash material) to the reheater and next environmental equipment and to reduce the operating obstruction of environmental equipment.

After the step of transferring the heated combustion gas transferred to the first cyclone section to the repeater of the heat exchange section and transferring the fluid sand to the relay section (S240), a step of resupplying the fluid sand transferred to the relay section to the boiler section (S250) may be performed.

In the step of resupplying the fluid sand transferred to the relay section to the boiler section (S250), the fluid sand supplied from the first cyclone section 170 to the relay section 115 may flow down from the top of the boiler section 110 for recirculation.

Since the fluid sand is evenly distributed by the relay section 115 when it flows down in the boiler section 110, it is possible to improve combustion and heat transfer efficiency. The fluid sand falling type circulating fluidized bed boiler with a plurality of risers 100 and the method of operating the same provided as described above may be applied to a power generation plant and a power generation system.

The present invention with the above-mentioned configuration has an effect of preventing the erosion and corrosion of the water tube sections. In the present invention, the fluid sand flows down in the boiler section, and the water tube sections, which are mainly disposed only on the wall surface of the riser section in the related art, are disposed on the wall surface and in the inner portion of the boiler section. Therefore, since the boiler section of the present invention does not need to maintain a high flow rate of 4 to 5 m/s to circulate the fluid sand, the fluid sand cannot cause the erosion or corrosion of the water tube section 140.

Furthermore, the flow rate in the boiler section of the present invention can be controlled according to the injection amount of oxidizer into the oxidizer injecting sections in the multistage form, the fluid sand or the desulfurizing agent having a small particle size can be used, and it is possible to prevent the erosion and corrosion of the water tube by the low descending rate of the particles.

The present invention has an effect of implementing full combustion by adjusting the reaction time of fuel and oxidizer and utilizing a re-combustion technique in the process of speed control through the multistage supply of the oxidizer since the residence time of particles is adjustable through the control of the flow rate in the boiler section.

The prevent invention can maximize a desulfurization effect by reacting for a long time using the desulfurizing agent having a small particle size.

Since a large number of water tube sections are arranged in the internal space together with on the outer wall of the boiler section, the boiler of the present invention is reduced in volume and thus is economical.

The present invention includes a plurality of riser sections and each of the riser sections is individually controlled. Therefore, it is possible to easily control the total output of the boiler according to the number of operated riser sections.

Since the entire boiler system can be rapidly preheated in the riser sections and some riser sections sequentially start to operate and control the circulation of fluid sand during partial load operation when the fluid sand falling type circulating fluidized bed boiler with a plurality of risers starts to operate in the present invention, the operation preparation time or the output change time can be significantly shortened compared to the related art. That is, the present invention is effective in both of cold start up operation and warm start up operation, compared to the related art.

In addition, the present invention enables the use of materials such as fluid sand, desulfurizing agent, and additives having a small particle size compared to the existing boiler. Specifically, since the plurality of riser sections are provided in the present invention, the size of the first cyclone section connected to the riser sections is greatly reduced, with the consequence that it is possible to significantly increase particle collection efficiency and use smaller particles. As the sizes of the fluid sand particles are reduced, the power of the fan used for circulation is reduced, which enables an improvement in power generation efficiency.

In the present invention, since the first cyclone section and the second cyclone section are separately provided, it is possible to prevent the transfer of fine particles (crushed fluid sand or ash material) to the reheater and next environmental equipment and to reduce the operating obstruction of environmental equipment.

In addition, since the low-temperature combustion gas produced in the boiler section provided with a plurality of heat exchangers and the combustion gas maintained at a relatively high temperature in the riser section are separately transferred to the convection heat exchanger and the reheater, respectively, in the present invention, it is possible to produce steam having a higher temperature and pressure.

The present invention is not limited to the above effects, and it should be understood that the present invention includes all effects which can be inferred from the detailed description of the present invention or the configuration of the invention defined by the appended claims.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

What is claimed is:

1. A fluid sand falling type circulating fluidized bed boiler with a plurality of risers, comprising:
   a boiler section into which fuel is injected through a fuel injection section on one side of an upper portion of the boiler and combusted while flowing down therein, and into which oxidizer is injected through a plurality of oxidizer injection sections on a side wall of the boiler section in a height direction of the boiler section;
   a riser section connected to the boiler section so that the combusted fuel and fluid sand supplied from the boiler section are introduced from a bottom of the riser section and flow up;
   a relay section provided on the boiler section to supply the fluid sand having passed through the riser section to the boiler section; and
   a plurality of water tube sections provided on an outer wall and in an internal space of the boiler section and extending in the height direction of the boiler section.

2. The fluid sand falling type circulating fluidized bed boiler according to claim 1,
wherein each output of the plurality of oxidizer injection sections is individually controlled to control descending rates of the fluid sand and the fuel and combustion of the fuel, and
wherein the plurality of oxidizer injection sections provided in a lower portion of the riser section includes a nozzle configured to decrease an injection amount of oxidizer when an amount of flow and a flow rate are increased in the riser section and to increase the injection amount of oxidizer when the amount of flow and the flow rate are decreased in the riser section.

3. The fluid sand falling type circulating fluidized bed boiler according to claim 1, further comprising a second fuel injection section provided at one side of a lower portion of the riser section to inject fuel, having a combustion rate higher than the fuel supplied into the boiler section, to the riser section.

4. The fluid sand falling type circulating fluidized bed boiler according to claim 1, wherein the riser section includes a plurality of riser sections arranged along a circumference of the boiler section or in an inner portion of the boiler section.

5. The fluid sand falling type circulating fluidized bed boiler according to claim 1, further comprising a heat exchange section connected to the boiler section and the riser section to perform heat exchange using combustion gas produced by burning fuel.

6. The fluid sand falling type circulating fluidized bed boiler according to claim 5, further comprising a first cyclone section provided between the riser section and the relay section,
wherein the first cyclone section is provided to transfer the combustion gas, the combustion gas being heated while passing through the riser section, to a final superheater or a reheater of the heat exchange section.

7. The fluid sand falling type circulating fluidized bed boiler according to claim 5, further comprising a second cyclone section connected to an upper portion of the boiler section,
wherein the second cyclone section serves to transfer the combustion gas produced in the boiler section to a convection heat exchanger of the heat exchange section.

8. A method of operating the fluid sand falling type circulating fluidized bed boiler with the plurality of risers according to claim 1, comprising:
a) a step of determining an operation mode or operation of each of a plurality of riser sections;
b) a step of injecting the fuel and oxidizer into the boiler section to burn the fuel;
c) a step of transferring the fuel and fluid sand supplied from the boiler section to each of the riser sections to a first cyclone section;
d) a step of transferring heated combustion gas transferred to the first cyclone section to a reheater of a heat exchange section and transferring the fluid sand to the relay section; and
e) a step of resupplying the fluid sand transferred to the relay section to the boiler section,
wherein the fuel is burned while flowing down in the boiler section, and the fuel is burned while flowing up in the riser section,
wherein in the b) step, each output of a plurality of oxidizer injection sections for injecting oxidizer into the boiler section is individually controlled to control descending rates of the fluid sand and the fuel and combustion of the fuel, and
wherein the b) step further includes using an oxidizer injection section provided in a lower portion of at least one riser of the plurality of the risers to decrease an injection amount of oxidizer when an amount of flow and a flow rate are increased in the at least one riser and to increase the injection amount of oxidizer when the amount of flow and the flow rate are decreased in the at least one riser.

9. The method according to claim 8, wherein in the b) step, the combustion gas, having been produced by burning the fuel in the boiler section, is transferred to a convection heat exchanger of the heat exchange section through a second cyclone section.

10. The method according to claim 8, wherein in the c) step, fuel, having a combustion rate higher than the fuel supplied into the boiler section, is further supplied to the riser section.

11. The method according to claim 8, wherein in the a) step, the operation mode is one of: a pure oxygen combustion mode and an air combustion mode.

12. A power generation plant using a fluid sand falling type circulating fluidized bed boiler for oxidizer thermal power generation with a plurality of risers, the fluid sand falling type circulating fluidized bed boiler comprising:
a boiler section into which fuel is injected through a fuel injection section on one side of an upper portion of the boiler and combusted while flowing down therein, and into which oxidizer is injected through a plurality of oxidizer injection sections on a side wall of the boiler section in a height direction of the boiler section;
a riser section connected to the boiler section so that the combusted fuel and fluid sand supplied from the boiler section are introduced from a bottom of the riser section and flow up;
a relay section provided on the boiler section to supply the fluid sand having passed through the riser section to the boiler section; and
a plurality of water tube sections provided on an outer wall and in an internal space of the boiler section and extending in the height direction of the boiler section.

13. A power generation system for oxidizer thermal power generation using a fluid sand falling type circulating fluidized bed boiler with a plurality of risers, the fluid sand falling type circulating fluidized bed boiler comprising:
a boiler section into which fuel is injected through a fuel injection section on one side of an upper portion of the boiler and combusted while flowing down therein, and into which oxidizer is injected through a plurality of oxidizer injection sections on a side wall of the boiler section in a height direction of the boiler section;
a riser section connected to the boiler section so that the combusted fuel and fluid sand supplied from the boiler section are introduced from a bottom of the riser section and flow up;
a relay section provided on the boiler section to supply the fluid sand having passed through the riser section to the boiler section; and
a plurality of water tube sections provided on an outer wall and in an internal space of the boiler section and extending in the height direction of the boiler section.

* * * * *